United States Patent
Boudreau et al.

(10) Patent No.: US 10,034,321 B2
(45) Date of Patent: Jul. 24, 2018

(54) MACHINE TYPE COMMUNICATION VIRTUAL SHARED MOBILE APPARATUS AND METHOD

(71) Applicant: Telefonaktiebolaget L M Ericsson (Publ), Stockholm (SE)

(72) Inventors: Gary David Boudreau, Kanata (CA); Virgil Cimpu, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 459 days.

(21) Appl. No.: 13/922,997

(22) Filed: Jun. 20, 2013

(65) Prior Publication Data

US 2014/0376454 A1    Dec. 25, 2014

(51) Int. Cl.
*H04W 76/00* (2018.01)
*H04W 76/11* (2018.01)
(Continued)

(52) U.S. Cl.
CPC ............ *H04W 76/11* (2018.02); *H04W 4/70* (2018.02); *H04W 24/02* (2013.01); *H04W 8/26* (2013.01); *H04W 88/08* (2013.01)

(58) Field of Classification Search
CPC ... H04W 24/02; H04W 76/021; H04W 76/02; H04W 4/005; H04W 88/08; H04W 92/18; H04W 88/02; H04W 8/26
See application file for complete search history.

(56) References Cited

U.S. PATENT DOCUMENTS

| | | |
|---|---|---|
| 2011/0053619 A1 | 3/2011 | Shaheen et al. |
| 2011/0252235 A1 | 10/2011 | Dolan et al. |

(Continued)

FOREIGN PATENT DOCUMENTS

WO    WO2011082150 A1    7/2011

OTHER PUBLICATIONS

3GPP TR 36.814 v9.0.0, E-UTRA Physical Layer Aspects, Mar. 2010, pp. 1-104.
(Continued)

*Primary Examiner* — Ian N Moore
*Assistant Examiner* — Brian T Le
(74) *Attorney, Agent, or Firm* — Christopher & Weisberg, P.A.

(57) ABSTRACT

The present disclosure proposes a Virtual Shared Mobile (VSM) feature at eNodeB level, relay node, ore UE or device level that will allow multiple MTC devices to be grouped together and be presented to the rest of Mobile Network as one Virtual Shared Mobile (VSM). The MTC Application Servers will authenticate and manage individual MTC devices. This will decrease the number of devices that are managed by the mobile network and hence decreasing the control signalling volume. Devices belonging to the same Virtual Shared Mobile Group (VSMG) will use time division to share the same Radio Bearer (same IMSI) and hence decreasing the interference to the other UEs in the mobile network. Overall the disclosure will allow data gathering from a large number of MTC devices with limited impact on the Mobile Network. Disclosed herein are aspects of the VSM concept, including inter alia: (1) the VSM implemented in the eNB; (2) the VSM implemented in a relay node; and (3) the VSM implemented in a UE or device acting as a relay node in a device-to-device configuration.

9 Claims, 8 Drawing Sheets

(51) Int. Cl.
  *H04W 4/70* (2018.01)
  *H04W 24/02* (2009.01)
  *H04W 88/08* (2009.01)
  *H04W 8/26* (2009.01)

(56) References Cited

U.S. PATENT DOCUMENTS

| | | |
|---|---|---|
| 2011/0268047 A1* | 11/2011 | Nath .................... H04W 4/005 |
| | | 370/329 |
| 2012/0163160 A1 | 6/2012 | Himayat et al. |
| 2013/0007278 A1 | 1/2013 | Srinivasan |
| 2013/0029716 A1 | 1/2013 | Lee et al. |
| 2013/0035127 A1 | 2/2013 | Wang |

OTHER PUBLICATIONS

3GPP TS 36.211 v11.0, E-UTRA Physical Channels and Modulation, Oct. 2010, pp. 1-108.
3GPP TS 36.216 v10.3.1, E-UTRA Physical Layers for Relaying Operation, Sep. 2011, pp. 1-16.
An Addendum to NGMN White Paper 3.0, Version 2.2, Sep. 1, 2012, pp. 1-9.
PCT International Search Report from corresponding application PCT/IB2014/062456, dated Sep. 18, 2014.
International Search Report and Written Opinion dated Sep. 26, 2014 for International Application Serial No. PCT/IB2014/062456, International Filing Date: Jun. 19, 2014 consisting of 10-pages.
European Search Report dated Nov. 16, 2017 issued in corresponding European Regional Phase Application No. 14739239.3, consisting of 6-pages.

* cited by examiner

MACHINE TYPE COMMUNICATION VIRTUAL SHARED MOBILE APPARATUS AND METHOD

CROSS-REFERENCE TO RELATED APPLICATIONS

This is the first application filed for the present application.

TECHNICAL FIELD

This application relates to machine type communications in general, and to a machine type communication virtual shared mobile apparatus and method, in particular.

BACKGROUND OF THE APPLICATION

The growing demands on mobile networks to support data applications at higher throughputs and spectral efficiencies has driven the need to develop Orthogonal Frequency Division Multiplexing (OFDM) based 4th generation (4G) networks including for 3GPP Long Term Evolution (LTE). A key objective with respect to deployment of OFDM 4G networks is to utilize a frequency re-use of one (denoted by N=1), or as close to N=1 re-use as is practical. A frequency re-use of N=1 implies that the cells in basestations transmit on all available time-frequency resources blocks (RBs) simultaneously. The need for higher throughputs in 4G networks, especially near the cell edge, combined with the constraint on the uplink link budget will necessitate the need for smaller cell sizes than is typically deployed for present 2nd generation (2G) and 3rd generation (3G) cellular systems. The addition of smaller cells can be deployed in a traditional homogenous cell splitting approach or in a more ad hoc heterogeneous approach in which pico cells or relay nodes are overlaid on an existing macro cellular network. For both a homogeneous and heterogeneous approach, the resulting interference limited system for N=1 deployment will not achieve the full potential capacity that the LTE standard can support without the implementation at the basestation and mobile terminal of one or more viable interference mitigation and or cancellation techniques.

Machine-to-machine (M2M) or MTC type devices are an emerging area of mobile communications that is expected to grow significantly in the next several years with an expected compounded annual growth rate (CAGR) of >25% in 2013.

It is desirable to find MTC solutions that ensure a clear business benefit to MTC UE vendors and operators for migrating low-end MTC UE's from GSM/GPRS to LTE networks.

The following references are incorporated herein by reference:
[1] 3GPP TS36.211, "E-UTRA Physical Channels and Modulation", v11.1
[2] 3GPP TS36.216, "E-UTRA Physical Layers for Relaying Operation," v10.3.
[3] 3GPP TR36.814, "E-UTRA Physical Layer Aspects", v9.0.

SUMMARY

According to one broad aspect of the present application, there is provided a machine-type-communication (MTC) virtual shared mobile (VSM) apparatus suitable for use in a communications network including a mobile network, the mobile network having wireless nodes including a wireless basestation node and wireless device nodes, the wireless base station node serving the wireless device nodes, a portion of the wireless devices being a plurality of MTC devices, the communications network connected to at least one MTC application server. The MTC VSM apparatus comprises: a node in the communications network, comprising a communications interface for participating in at least one MTC communication involving one of the at least one MTC application server and the at least one of the MTC devices; and a processor configured to operate with the communications interface, the processor adapted such that a portion of the at least one MTC related communication presents the plurality of MTC devices as one Virtual Shared Mobile wireless device having a single wireless device identifier to the mobile network. In some embodiments, the node in the communications network is one of an: MTC Device, UE, eNodeB, MME, S-GW, P-GW, MTC App Server, Relay Node, and Mobile Relay Node, Mobile Network MTC Authorization Server. In some embodiments, the portion of the at least one MTC related communication includes at least one of: RRC Conn, MTC Data Report, RRC Disconn, Joint VSMG REQ, Authorize Server REQ, Authorize Server RSP, Authorize Device REQ, Authorize Device REQ, Authorize Device RSP, Joint VSMG RSP and a communication carried over a VSM Radio Bearer. In some embodiments, the portion of the at least one MTC related communication includes at least one of: MTC server IP, data, MTC App Data Device, VSMG Control, MTC Server IP, eNodeB IP, VSM IP, MTC ID, S-GW IP, P-GW IP, UDP port, device ID, credentials, OK, Not OK, Device parameters, VSM, IMSI, local device ID, VSMG Control, and App data. In some embodiments, the plurality of MTC devices belong to a Virtual Shared Mobile Group (VSMG) having a VSMG identifier. In some embodiments, an MTC device that does not belong to the Virtual Shared Mobile Group (VSMG) utilises its own device identifier in an initial connection request to join the VSMG. In some embodiments, the communication node is an MTC device and wherein the communication node listens to a shared VSM Radio Bearer for at least one of VSM Control and VSM Device Data. In some embodiments, the communications node receives via the VSMG Control regarding allocated TTIs to send at least one of VSM Control and VSM Device Data to the at least one MTC server. In some embodiments, the MTC device uses its own mobile network identifier to send a VSM TTI grant request message to the communication node of the VSM apparatus. In some embodiments, the at least one portion of the at least one MTC related communication is encrypted at the application layer.

According to another broad aspect of the present application, there is provided a machine-type-communication (MTC) virtual shared mobile (VSM) method suitable for use in a communications network including a mobile network, the mobile network having wireless nodes including a wireless basestation node and wireless device nodes, the wireless base station node serving the wireless device nodes, a portion of the wireless devices being a plurality of MTC devices, the communications network connected to at least one MTC application server, the MTC VSM method comprising: providing a node in the communications network, the node comprising a communications interface for participating in at least one MTC communication involving one of the at least one MTC application server and the at least one of the MTC devices; and a processor configured to operate with the communications interface, the processor adapted to operate on a portion of the at least one MTC related communication; and presenting the plurality of MTC devices as one Virtual Shared Mobile wireless device such that the portion of the at least one MTC related communication uses a single identifier for the plurality of MTC devices.

Other aspects and features of the present application will become apparent to those ordinarily skilled in the art upon review of the following description of specific embodiments of a machine type communication virtual shared mobile apparatus and method in conjunction with the accompanying drawing figures.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION OF THE DRAWINGS

Figure 1:
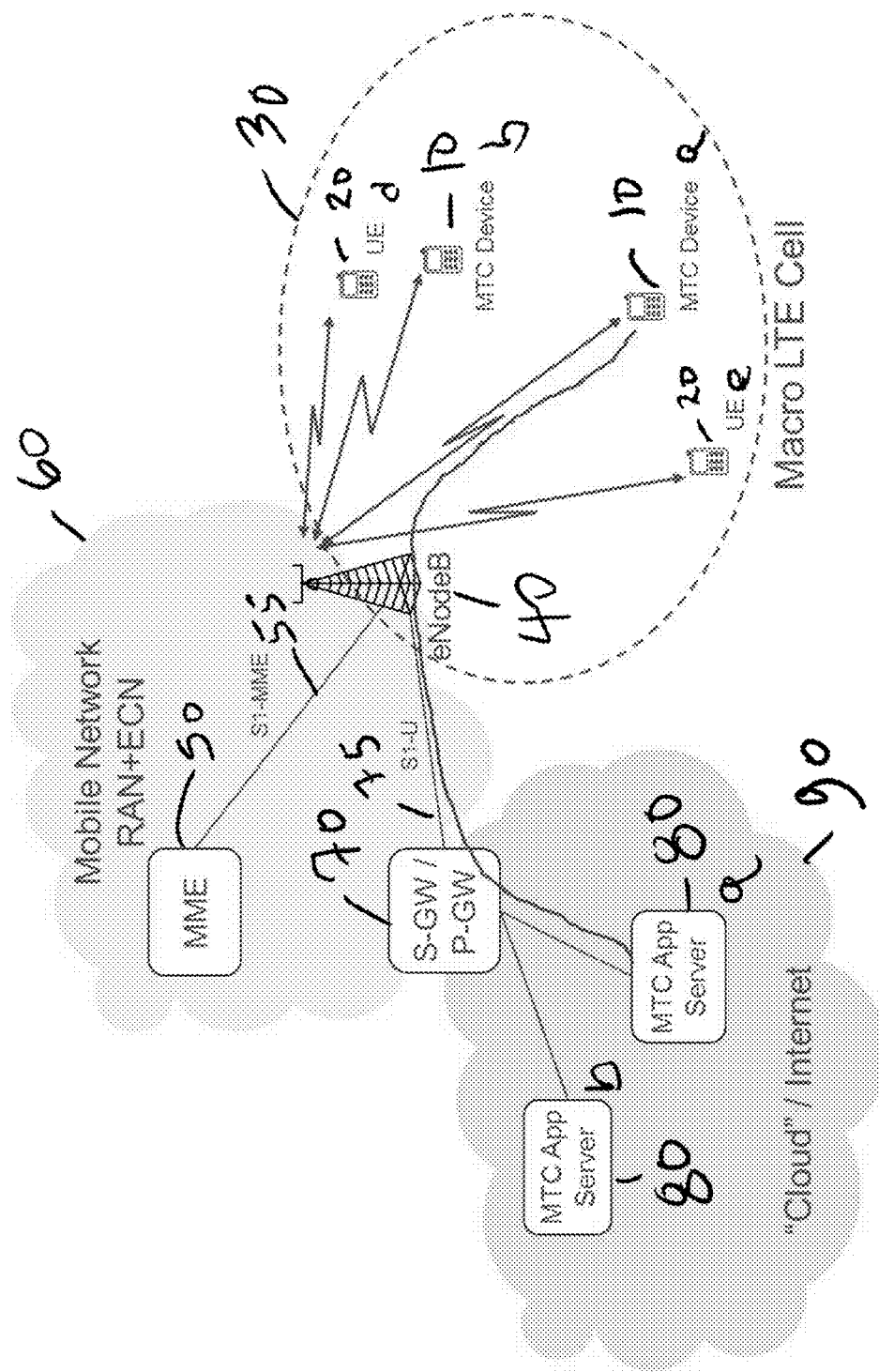
FIG. 1 is a block diagram illustrating an MTC Architecture.

The following abbreviations are used in this specification:
eNodeB—enhanced Node B (basestation)
DL—Down Link
EPC—Enhanced Packet Core
IMSI—International Mobile Subscriber Identity
IP—Internet Protocol
L1—Layer 1
L2—Layer 2
MAC—Medium Access Control
MME—Mobility Management Entity
MTC—Machine Type Communication
PDCP—Packet Data Convergence Protocol
PHY—Physical Layer
P-GW—Packet Data Network Gateway
RAN—Radio Access Network
RLC—Radio Link Control
S-GW—Serving Gateway
TDD—time division duplexing
TTI—Transmission Time Interval
UE—User Equipment
UL—Up Link
UDP—User Datagram Protocol
VSM—Virtual Shared Mobile
VSMG—Virtual Shared Mobile Group The following application is incorporated herein by reference:
[4] U.S. application Ser. No. 13/759,419, entitled "DETERMINING A CLUSTER SET OF MOBILE DEVICES".

The present disclosure is applicable to the Machine Type Communication (MTC) domain where information is collected by MTC Application servers from many devices distributed over large areas. To be cost effective in deploying and managing the MTC devices, it makes sense to use Mobile Networks, which are also referred to as wireless networks in the present disclosure. This disclosure uses the terms wireless and mobile interchangeably such that a wireless device or node can be understood to be the same as a mobile device or node.

The number of MTC Devices connected to Mobile Networks is expected to grow significantly and they will impact the performance of the mobile networks. This disclosure uses MTC and M2M interchangeably such that an MTC Device or node can be understood to be the same as an M2M Device or node.

The present disclosure may allow a large number of MTC devices to be connected to the mobile network and to limit the impact on the mobile network.

The number of MTC wireless devices connected to the network may grow significantly. The mobile networks may have to cope with the increased number of devices and the cost of managing the devices. This cost may include managing more devices at MME level, allocating individual IP addresses for each MTC device, managing increased number of GTP tunnels.

Many MTC devices are reporting data infrequently which means that for every data report the device has to go through a full connection request followed by a disconnect request. This may make the control plane signalling cost for establishing connections and tear them down the main mobile network bottleneck.

It is desirable to find MTC solutions that ensure a clear business benefit to MTC UE vendors and operators for migrating low-end MTC UE's from GSM/GPRS to LTE networks. Such benefits may include:

Reducing RF component cost in the devices, including (for example) simplifications and reductions in support of bands/RATs/RF chains/antenna ports, transmission power, maximum channel bandwidth less than the maximum specified for respective frequency band, and support of half-duplex FDD mode;

Methods for reducing the processing in the device, additionally considering baseband-RF conversion aspects, significantly lower peak data rate support, no support of spatial processing mode in uplink/downlink, and reduced radio protocol processing;

Support of backwards compatibility with existing LTE networks;

Support data rates equivalent to that supported by EGPRS including 118.4 Kbps and 59.2 Kbps;

Ensure that service coverage footprint of low cost MTC UE based on LTE is not any worse than the service coverage footprint of GSM/EGPRS MTC;

Ensure that overall power consumption is no worse than existing GSM/GPRS based MTC devices;

Target operation of low-cost MTC UEs and legacy LTE UEs on the same carrier.

Re-use the existing LTE/SAE network architecture;

Solutions should be specified in terms of changes to the Rel 10 version of the specifications;

Optimizations for both FDD and TDD mode shall be supported; and

Low cost MTC device support limited mobility (e.g. no support of seamless handover; ability to operate in networks in different countries) and are low power consumption modules.

The present disclosure focuses on MTC applications that require data collection from many devices spread on large areas. The MTC typical application anatomy is assumed to be composed of:

One or more MTC App Servers in the cloud that collect data from the distributed MTC devices; and Many distributed MTC devices that are responsible for data collection as well as executing commands from the server.

Devices belonging to the same Virtual Shared Mobile Group (VSMG) will use time division to share the same Radio Bearer (same IMSI) and hence decreasing the interference to the other UEs in the mobile network.

Overall the this disclosure will allow data gathering from a large number of MTC devices with limited impact on the Mobile Network. This disclosure includes, inter alia, three aspects of the VSM concept: (1) the VSM implemented in the eNB; (2) the VSM implemented in a relay node; and (3) the VSM implemented in a UE acting as a relay node in a device-to-device configuration.

Referring to the drawings, FIG. 1 is a block diagram illustrating an MTC Architecture. As shown in FIG. 1, MTC Device 10a, MTC Device 10b, UE 20d and UE 20e are located in Macro LTE Cell 30 served by eNodeB 40 to which they are wirelessly connected via LTE. eNodeB 40 is connected to MME 50 via interface S1-MME 55. MME 50 is located in Mobile Network RAN+ECN 60. eNodeB 40 is also connected to S-GW/P-GW 70 via interface S1-U 75. S-GW/P-GW 70 acts as a gateway to "Cloud"/Internet 90 whereat MTC App Server 80a and MTC App Server 80b are located.

It is assumed that the MTC devices will have low throughput requirements and will communicate with the MTC application servers infrequently. The MTC devices will send data to the MTC servers at pre-determined time intervals (e.g. water meter sending data once a month to the application server; weather station sending data once an hour), on request from the MTC server (server requesting an unscheduled weather report) or when an event occurs (weather station reporting a power outage event).

Figure 2:
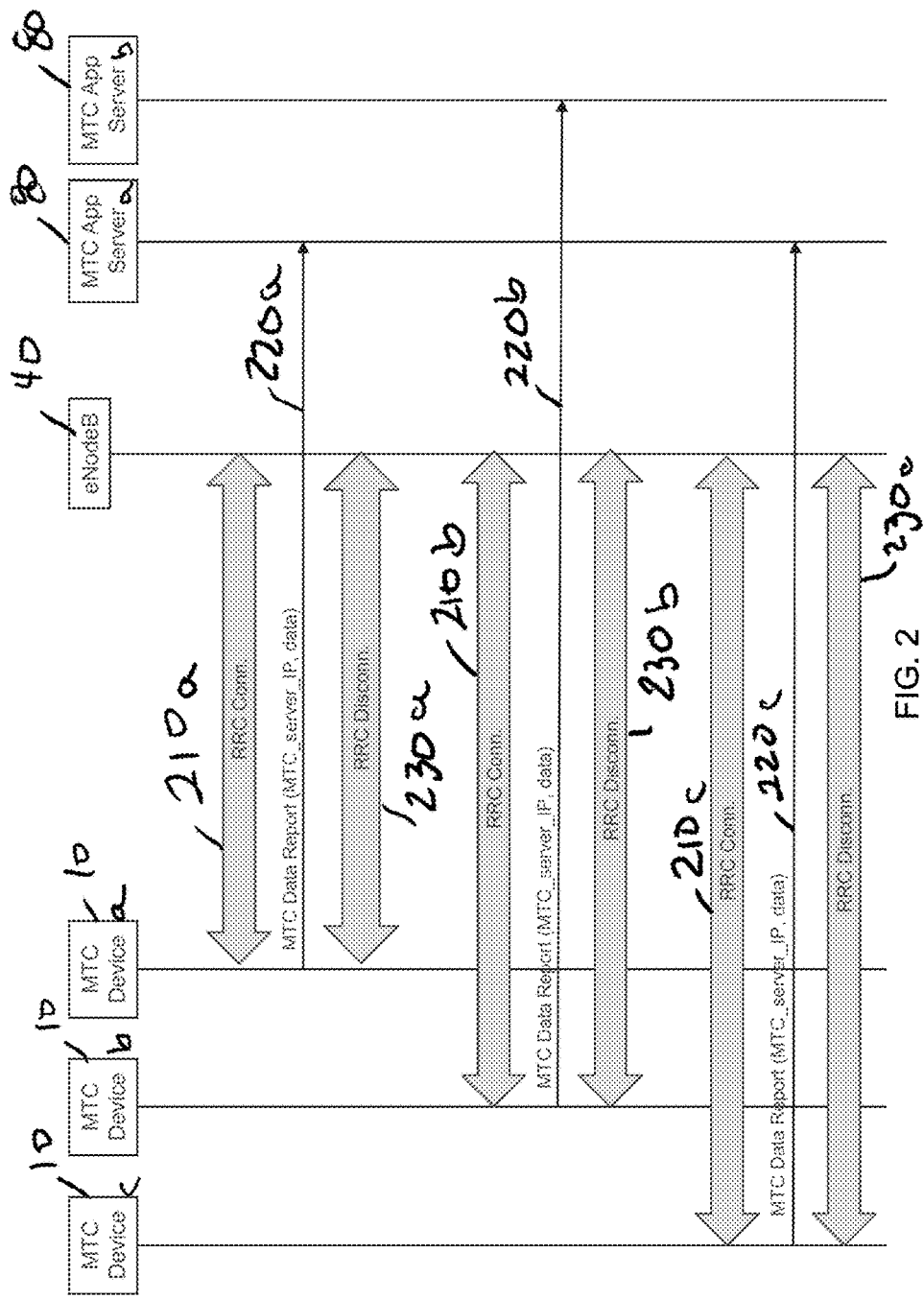
FIG. 2 is a signalling flow diagram illustrating communication between MTC Devices and MTC App Servers.

FIG. 2 is a signalling flow diagram illustrating communication between MTC Devices and MTC App Servers. As shown in FIG. 2, data reports MTC Data Report (MTC_server_IP, data) 230a, b, c from MTC Devices 10a, b, c require significant signalling overhead, to set up connections via RRC Conn. 210a, b, c and tear down connections via RRC Disconn. 230a, b, c, respectively, with MTC App Server 80a and MTC App Server 80b. It is noted that although only three MTC Devices 10a, b, c and 2 MTC App Servers 80a, b are shown for the sake of brevity, the amount of overhead is compounded by the presence of large numbers of MTC Devices and MTC App Servers.

The Mobile Networks (RAN+ECN) will have to cope with the increased number of MTC devices and with the increased signalling load that is characteristic for MTC devices. The introduction of MTC devices will change the ratio between the control data and user data and it will make the control signalling cost for establishing connections and tear them down the main Mobile Network bottleneck.

The present disclosure introduces a new feature at eNodeB level that will allow multiple devices to be grouped together and be presented to the rest of RAN as one Virtual Shared Mobile (VSM). The devices belonging to the same Virtual Shared Mobile Group (VSMG) will share the same UL and DL physical resources. Them Mobile Network and RAN (including MME and S-GW) will have no knowledge of the individual devices; instead, the MTC Application Servers will authenticate and manage individual MTC devices. This will decrease the number of devices that are managed by the mobile network, hence decreasing the control signalling volume.

Figure 3:
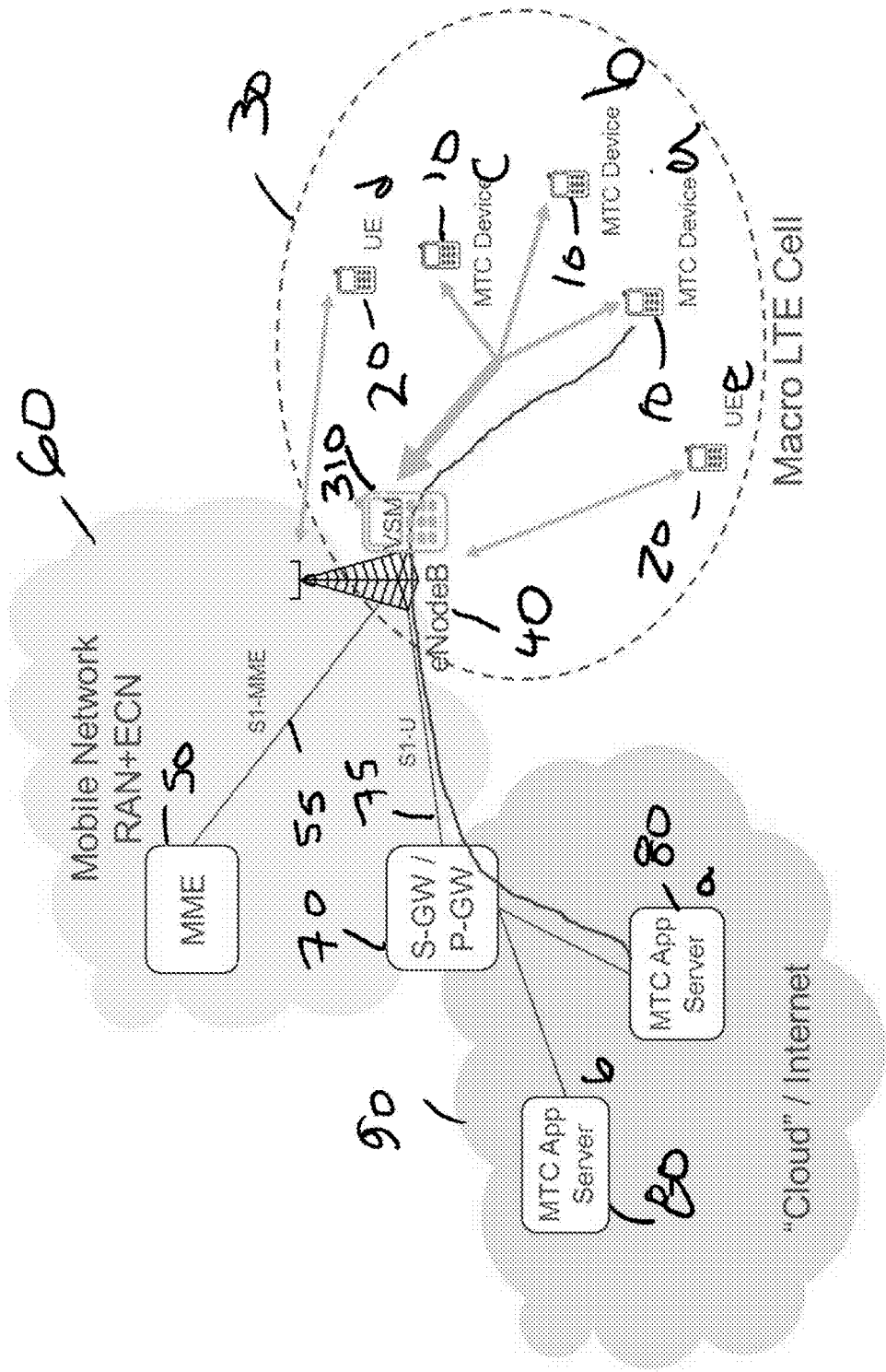
FIG. 3 is a block diagram illustrating an MTC Architecture including a VSM provided in accordance with the embodiments of the present disclosure.

FIG. 3 is a block diagram illustrating an MTC Architecture including a VSM provided in accordance with the embodiments of the present disclosure. According to a first aspect, as shown in FIG. 3, MTC Devices 10a, b, c and UE 20d, e are located in Macro LTE Cell 30 served by eNodeB 40. UE 20e, d is wirelessly connected via LTE directly to eNodeB 40. However MTC Devices a, b, c are connected to eNodeB 40 via VSM 310. eNodeB 40 is connected to MME 50 via interface S1-MME 55. MME 50 is located in Mobile Network RAN+ECN 60. eNodeB 40 is also connected to S-GW/P-GW 70 via interface S1-U 75. S-GW/P-GW 70 acts as a gateway to "Cloud"/Internet 90 whereat MTC App Server 80a and MTC App server 80b are located.

All the MTC devices using the VSM feature will have to join a Virtual Shared Mobile Group (VSMG) before they can communicate data to the MTC Application servers. The MTC devices belonging to the same VSMG will have the following in common:

They are all connected to the same cell

They will share the UL and DL physical resources

They will share the same IP that has been assigned to the VSM

Note that the MTC devices that are using the VSMG can communicate with the MTC Application servers. Communication between two MTC devices or between a MTC device and another internet entity is allowed "through" the application server, e.g. the MTC application server will play a proxy role.

Figure 4:
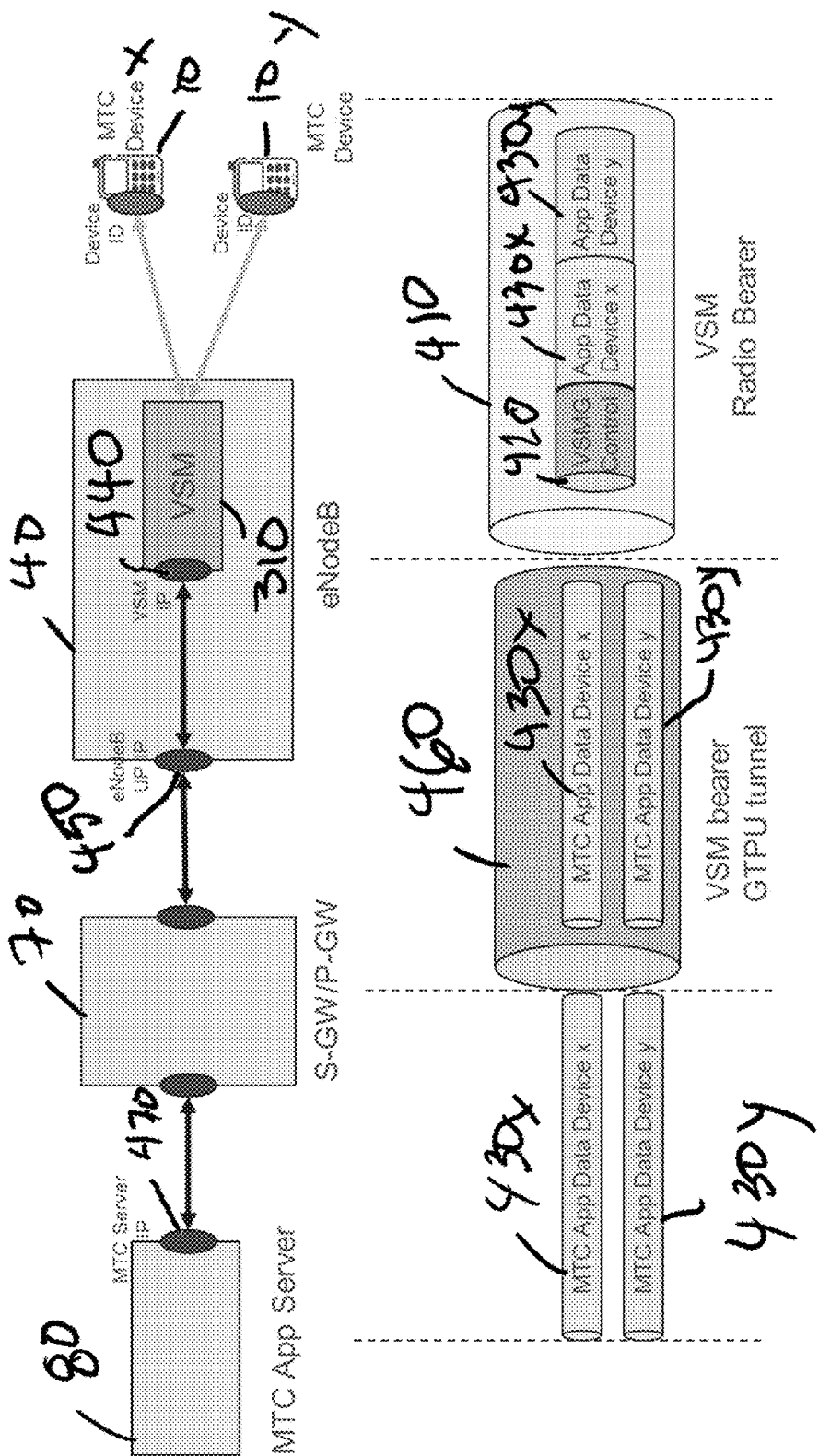
FIG. 4 is a block diagram illustrating the communication path between MTC App Server and MTC Devices, provided in accordance with embodiments of the present disclosure.

FIG. 4 is a block diagram illustrating the communication path between MTC App Server and MTC Devices, provided in accordance with embodiments of the present disclosure. MTC Devices 10x, y are connected to VSM 310 at eNodeB 40 via VSM Radio Bearer 410, which includes VSMG Control 420 and App Data Device 430x, y corresponding to respective MTC Devices 10x, y. VSM 310 has VSM IP 440 that is used to communicate via eNbodeB UP IP 450 with S-GW/P-GW 70 over VSM bearer GTPU tunnel 460, which includes MTC App Data Device 430x, y. S-GW/P-GW 70 communicates MTC App Data Device 430x, y in turn with MTC App Server 80 via MTC Server IP 470.

All MTC devices that are using the same VSMG will share the same radio bearers, e.g. the UL and DL physical resources:

In the DL, MTC devices in a VSMG will receive the same data from eNodeB, containing multiplexed information for individual devices. A new protocol "MTC ID" is used to specify the destination MTC device. The DL will also transport the "VSMG control" protocol that will specify among other things the UL TTI allocations to different devices.

In the UL, eNodeB will have a special VSM scheduler that will use time division to allocate different TTIs to individual MTC devices in the VSMG group. The allocation of TTIs can be done in advance, for devices that report data at pre-defined intervals, or it can be requested on-demand by individual devices. Once a TTI has been assigned to an individual MTC device, the device is allowed to use the UL PRBs allocated to VSM in that TTI.

The implementation of the DL and UL MTC time division protocol can be efficiently implemented by employing an LTE TDD transmission mode that utilizes TDD configuration 5 for DL transmission (i.e. having 8 DL subframes per frame) and TDD configuration 0 for UL (i.e. having 5 UL subframes per frame) [1].

For over-the-air communication, all MTC devices belonging to a VSMG will use the same IMSI that has been assigned to the VSM. The only exception is during the initial connection request when a new device is joining a VSMG—in this case, the MTC device's own IMSI is used.

Figure 5:
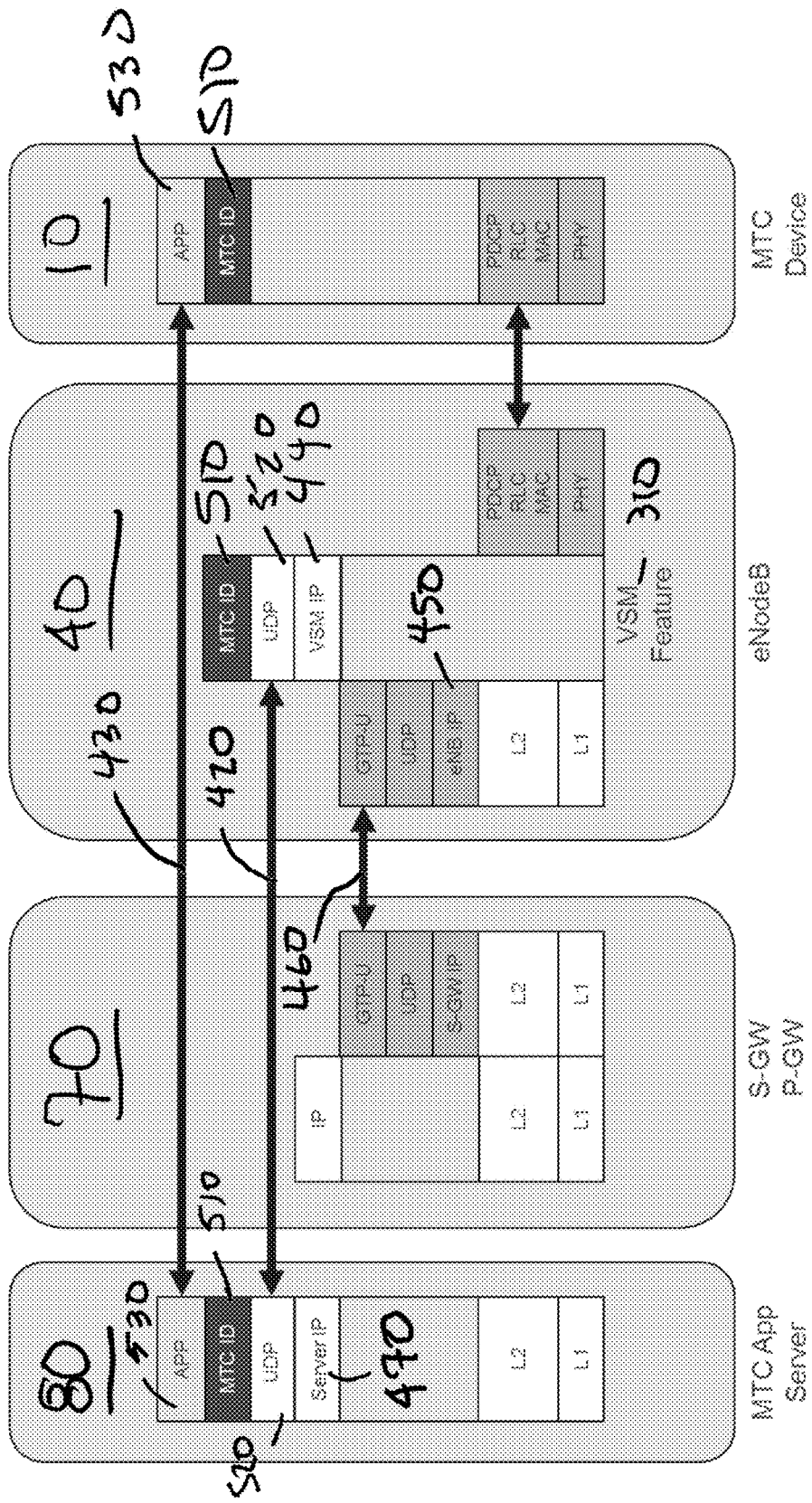
FIG. 5 is a block diagram illustrating the protocol stacks used by network entities with VSM implemented in an eNodeB, provided in accordance with embodiments of the present disclosure.

FIG. 5 is a block diagram illustrating the protocol stacks used by network entities with VSM implemented in an eNodeB, provided in accordance with embodiments of the present disclosure. The VSM IP 440 is terminated at the eNodeB 40 by the VSM 310 feature. VSM 310 will strip the IP 450 and UDP 520 headers and will send the "MTC ID" 510 header and App data 530 over the air.

Figure 6:
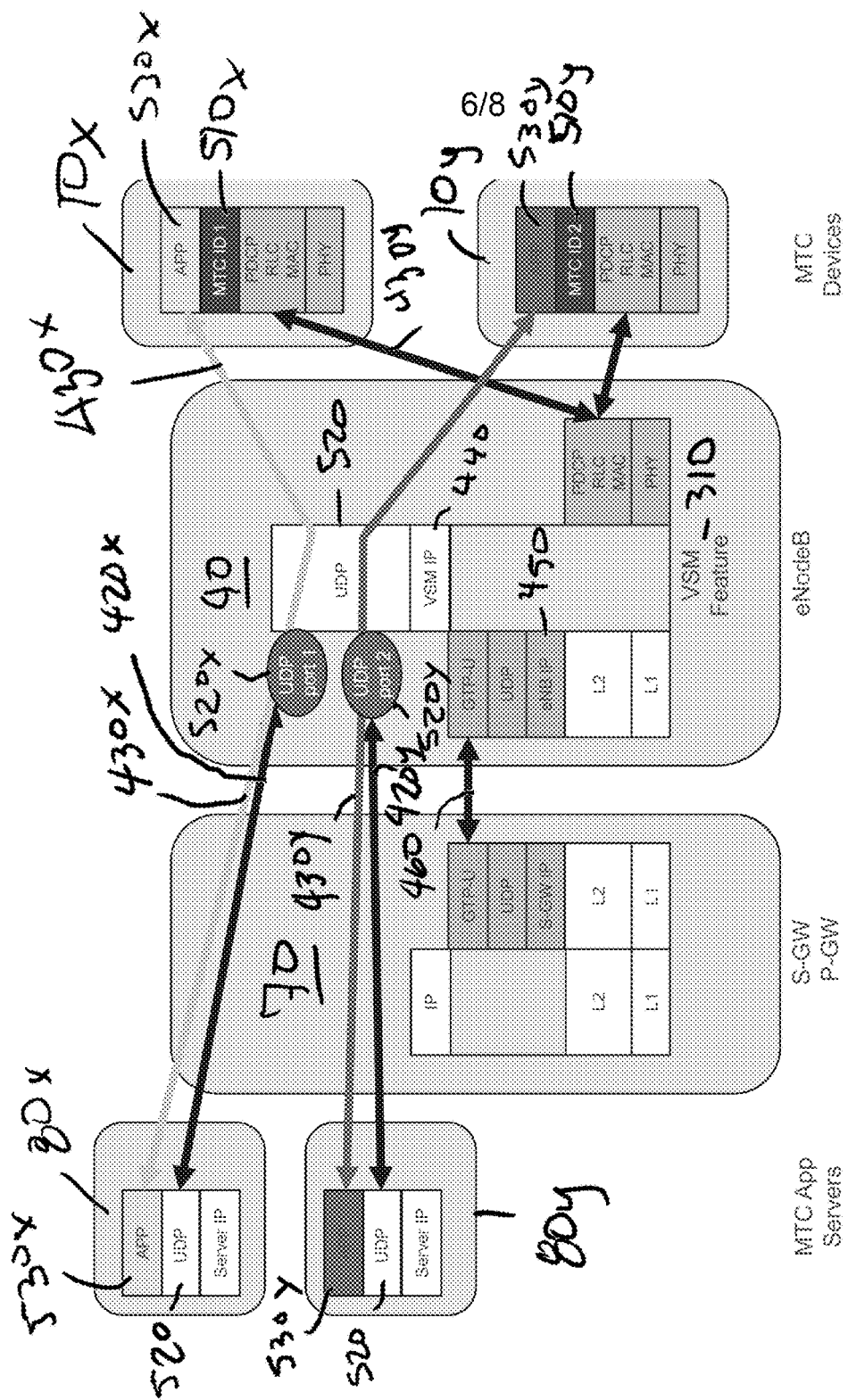
FIG. 6 is a block diagram illustrating the use of UDP ports, provided in accordance with embodiments of the present disclosure.

FIG. 6 is a block diagram illustrating the use of UDP ports, provided in accordance with embodiments of the present disclosure. An alternative of using the "MTC ID" protocol is to use the UDP port numbers 520x, y to identify the local MTC device ID 510x, y. MTC App Servers 80x, y communicate App Data 530x, y to respective MTC Devices 10x, y via UDP ports 520x, y UDP port 1 and UDP Port 2 of VSM 310 feature provided at eNodeB 40.

Figure 7:
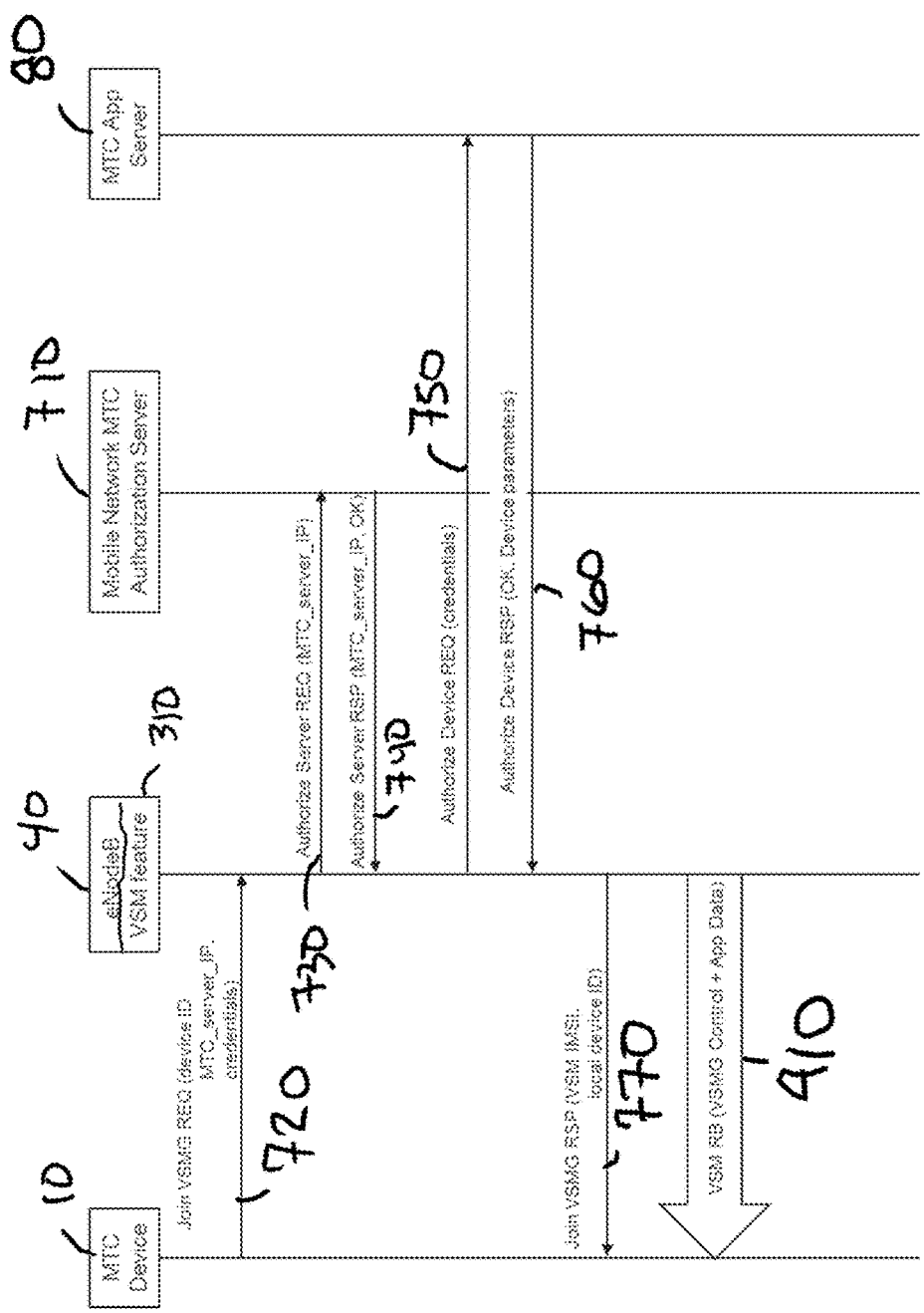
FIG. 7 is a signalling flow diagram illustrating an MTC device connection procedure, provided in accordance with embodiments of the present disclosure.

FIG. 7 is a signalling flow diagram illustrating an MTC device connection procedure, provided in accordance with embodiments of the present disclosure.

The MTC device connection procedure is described as follows:

The MTC device 10, using its own IMSI, sends a special "Join VSMG" request Join VSMG REQ (device ID, MTC_server_IP, credentials) 720 to the eNodeB 40 with the VSM 310 Feature to join the VSMG. The request will contain the device ID, the IP of the MTC server that will authenticate the device and the credentials of the MTC device 10.

The eNodeB 40 will receive the "Join VSMG" request 720 and will check if the MTC server 80 is one of the authorized servers in its list. If not, it will contact a server inside mobile network Mobile Network MTC Authorization Server 710 to check if the MTC server 80 is authorized by sending Authorize Server REQ (MTC_server_IP) 730:
  i. If the MTC server 80 is not authorized, the connection will be rejected (not shown).
  ii. If the server is authorized by receiving Authorize RSP (MTC_server_IP, OK) 740, the connection procedure continues to the next step.

The eNodeB 40, using the VSM IP 440 as source address, will contact the MTC Application Server 80 and it will pass the MTC device ID (not shown) and credentials by sending Authorize Device REQ (credentials) 750. If the device is authenticated, the server will record the VSM IP address as the proxy IP address, then will send a confirmation message to the eNodeB 40 by sending Authorize Device RSP (OK, Device parameters) 760. The confirmation message will contain details about the MTC device behaviour, like the interval of periodic reports expected from the device, the size of the report, the timeframe when the report is useful and also if unscheduled event notifications are expected from the device.

The eNodeB 40 will allocate a local ID for the MTC device and it will add it to the VSMG. Then will send confirmation message Join VSMG RSP (VSM IMSI, local device ID) 770 to the device, including the IMSI of the VSM that has to be used for future communication.

Using the VSM IMSI, the MTC device 10 will listen to the shared VSM Radio Bearer 410.

Once the MTC device has been added to the VSMG, it can exchange data to its own MTC server. The VSM feature of the eNodeB will play a proxy role as follows:

On the DL:
  i. The VSM will receive data from several servers toward the devices that are part of its VSMG. The data will be multiplexed and each data segment will be prefixed with the "MTC ID" header that contains the local ID of the destination MTC device. Then the data is forwarded over-the-air and all MTC devices in the group will receive it and the destination device will extract the data.
  ii. The DL will also carry "VSMG control" protocol containing information about the UL TTI allocation.

On the UL:
  i. Once the device receives information through the "VSMG control" protocol regarding the allocated TTIs, the device will use them to send information to the server. Same "MTC ID" protocol header is used to identify the device where the data originated.
  ii. On the eNodeB, the VSM feature will use the device ID contained in the "MTC ID" header to retrieve the associated MTC server IP, then will build the UDP packet with the App data+"MTC ID" header and send it to the server.
  iii. For the unscheduled reports that are critical to be sent to the server before the next TTI is allocated to the device, the MTC device will use its own IMSI to send a special "VSM TTI grant request" message to the VSM feature on eNodeB. The VSM feature will re-schedule the TTIs and will send the new TTI allocation through the "VSMG control" protocol.

Since the data in the DL is received by all MTC devices belonging to the same VSMG, it is contemplated by the present disclosure that the application layer may secure the application data using a predetermined encryption algorithm.

Figure 8:
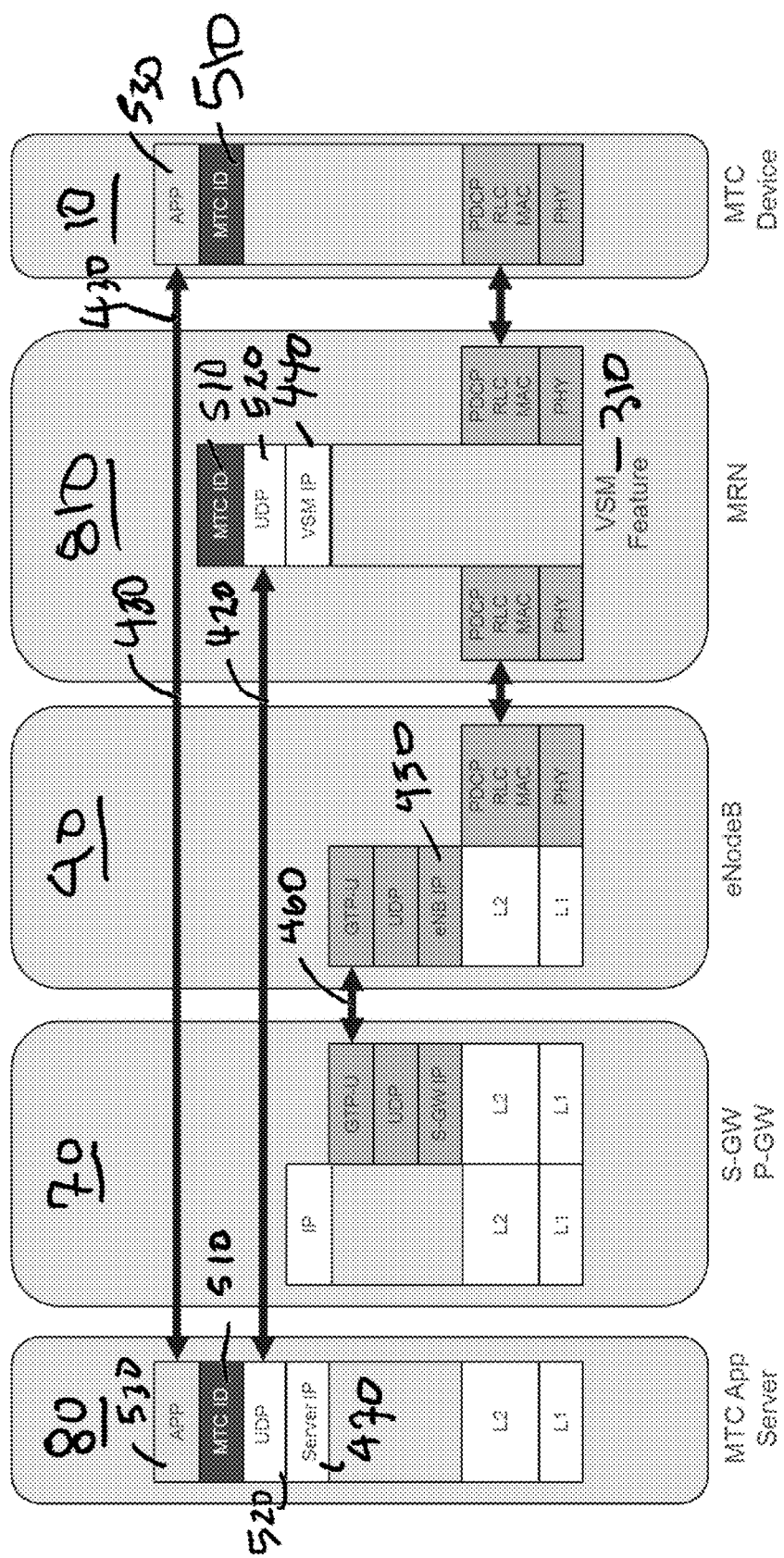
FIG. 8 is a block diagram illustrating the protocol stacks used by network entities with VSM implemented in a MRN, provided in accordance with embodiments of the present disclosure.

FIG. 8 is a block diagram illustrating the protocol stacks used by network entities with VSM implemented in a MRN, provided in accordance with embodiments of the present disclosure. According to a second aspect, the VSM 310 feature functionality is provided in a relay node MRN 810 that is served by the eNodeB 40 of the given cell. The VSM protocol stack as shown in FIG. 5 has been adapted in FIG. 8 to operate in the Relay node 810 with the eNodeB 40 providing the S-GW/P-GW 70 functionality as before. The VSM 310 entity in the RN 810 will communicate with the MTC application server 80 after joining the VSMG as described above.

According to a third aspect the VSM feature is provided in mobile device or UE. This approach is viable for UE's that support device-to-device (D2D) communication. In this aspect the VSM functionality will reside in the UE and the UE will implement the VSM and VSMG functionality as described above in regard to the first and second aspect. The selection of a UE to support the VSM feature can be based on the steps of (i) discovery; (ii) calculation of similarity metrics; (iii) clustering and (iv) transmission of information as defined in [4]. In this aspect, the UE will act as a relay node as described in regard to the second aspect.

Embodiments of the aspects of the present disclosure may help the Mobile Networks to cope with the increase in the number of MTC devices. The individual MTC devices in the same cell are grouped together and sharing the same UL and DL physical resources. This is achieved by introducing a new Virtual Shared Mobile feature at eNodeB level or relay node level or UE or Device level. The main advantages of this approach are:

Reduced number of UEs that have to be managed by mobile network (MME and S-GW). This includes:
i. Reduced control plane signalling volume, including the number of RRC connections and releases, number of paging requests.
ii. Reduced number of IP addresses allocated inside the mobile network.
iii. Reduced number of GTP-U tunnels.

Decreased cell resources allocated for MTC devices which will allow more cell capacity to be allocated to other types of UEs.

A decrease in the interference from MTC devices towards other UEs using the same RAN Overall the disclosure will allow data gathering from a large number of MTC devices with limited impact on the Mobile Network.

The above-described embodiments of the present application are intended to be examples only. Those of skill in the art may effect alterations, modifications and variations to the particular embodiments without departing from the scope of the application, which is set forth in the claims.

What is claimed is:

1. A machine-type-communication (MTC) virtual shared mobile (VSM) apparatus suitable for use in a communications network including a mobile network, the mobile network having wireless nodes including a wireless base station node and wireless device nodes, the wireless base station node serving the wireless device nodes, a portion of the wireless device nodes being a plurality of MTC devices, the communications network connected to at least one MTC application server, the MTC VSM apparatus comprising:

a node of the wireless device nodes in the communications network, comprising:
a communications interface for participating in at least one MTC related communication involving one of the at least one MTC application server and at least one of the plurality of MTC devices, an MTC device of the plurality of MTC devices that does not belong to a virtual shared mobile group (VSMG) utilizes a device identifier of the MTC device that does not belong to the VSMG in an initial connection request to join the VSMG and at least one of the plurality of MTC devices belongs to the VSMG having a VSMG identifier that permits sharing the same uplink and downlink physical resources; and
a processor configured to operate with the communications interface, the processor configured such that a portion of the at least one MTC related communication presents the plurality of MTC devices to the at least one MTC application server as one VSM wireless device having a single mobile subscriber identity such that the mobile network is unaware of the plurality of MTC devices, communications relating to each of the plurality of MTC devices being multiplexed over a single channel.

2. The MTC VSM apparatus of claim 1, wherein the node in the communications network is one of an: MTC Device, user equipment (UE), enhanced Node B (eNodeB), Mobility Management Entity (MME), Serving Gateway (S-GW), Packet Data Network Gateway (P-GW), MTC App Server, Relay Node, Mobile Relay Node, and Mobile Network MTC Authorization Server.

3. The MTC VSM apparatus of claim 1, wherein the portion of the at least one MTC related communication includes at least one of: Radio Resource Control (RRC) Conn, MTC Data Report, RRC Disconn, Joint Virtual Shared Mobile Group (VSMG) REQ, Authorize Server REQ, Authorize Server RSP, Authorize Device REQ, Authorize Device REQ, Authorize Device RSP, Joint VSMG RSP and a communication carried over a VSM Radio Bearer.

4. The MTC VSM apparatus of claim 1, wherein the portion of the at least one MTC related communication includes at least one of: MTC server IP, data, MTC App Data Device, Virtual Shared Mobile Group (VSMG) Control, MTC Server IP, enhanced Node B (eNodeB) IP, VSM IP, MTC ID, Serving Gateway (S-GW) IP, Packet Data Network (P-GW) IP, User Datagram Protocol (UDP) port, device ID, credentials, OK, Not OK, Device parameters, VSM, International Mobile Subscriber Identity (IMSI), local device ID, and App data.

5. The MTC VSM apparatus of claim 1, wherein the node in the communications network is an MTC device and wherein the node in the communications network listens to a shared VSM Radio Bearer for at least one of VSM Control and VSM Device Data.

6. The MTC VSM apparatus of claim 5, wherein the node in the communications network receives via VSMG Control regarding allocated Transmission Time Intervals (TTIs) to send at least one of the VSM Control and the VSM Device Data to the at least one MTC application server.

7. The MTC VSM apparatus of claim 1, wherein the at least one of the plurality of MTC devices uses a mobile network identifier of the at least one of the plurality of MTC devices to send a VSM Transmission Time Interval (TTI) grant request message to the node in the communications network of the MTC VSM apparatus.

8. The MTC VSM apparatus of claim 1, wherein the portion of the at least one MTC related communication is encrypted at the application layer.

9. A machine-type-communication (MTC) virtual shared mobile (VSM) method suitable for use in a communications network including a mobile network, the mobile network having wireless nodes including a wireless base station node and wireless device nodes, the wireless base station node serving the wireless device nodes, a portion of the wireless device nodes being a plurality of MTC devices, the communications network connected to at least one MTC application server, the MTC VSM method comprising:

providing a node of the wireless device nodes in the communications network, the node:
participating in at least one MTC related communication involving one of the at least one MTC application server and at least one of the plurality of MTC devices, an MTC device of the plurality of MTC devices that does not belong to a virtual shared mobile group (VSMG) utilizes a device identifier of the MTC device that does not belong to the VSMG in an initial connection request to join the VSMG and at least one of the plurality of MTC devices belongs to the VSMG having a VSMG identifier that permits sharing the same uplink and downlink physical resources; and
presenting the plurality of MTC devices to the at least one MTC application server as one VSM wireless device such that a portion of the at least one MTC related communication uses a single mobile subscriber identity such that the mobile network is unaware of the plurality of MTC devices, communications relating to each of the plurality of MTC devices being multiplexed over a single channel.

* * * * *